Patented Feb. 17, 1942

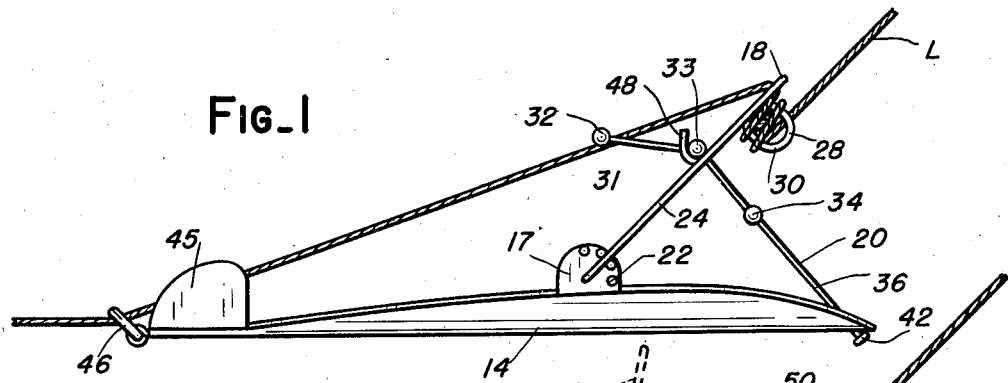
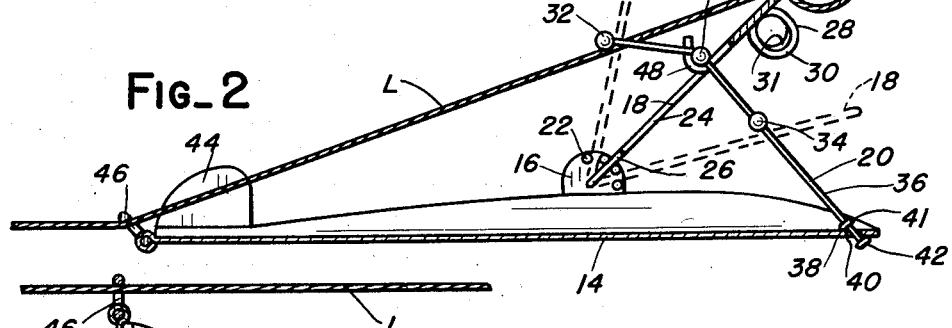
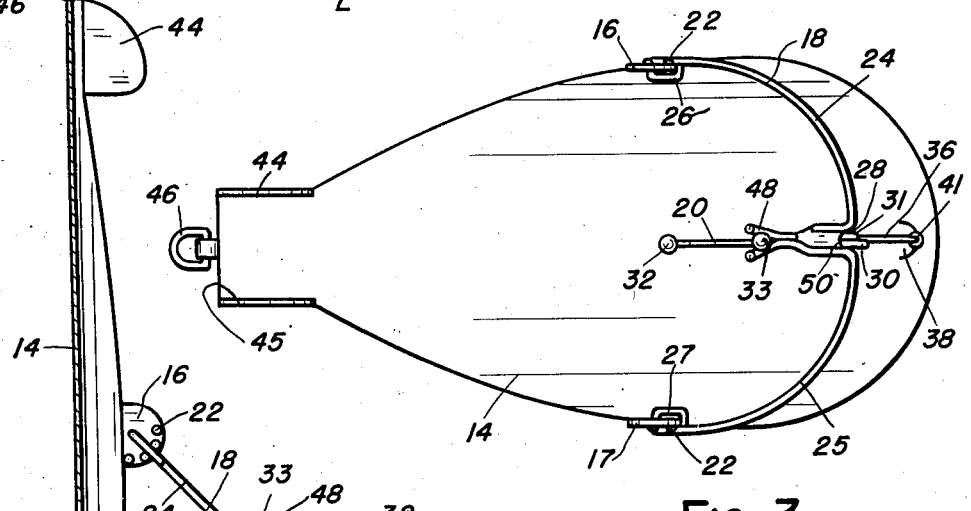
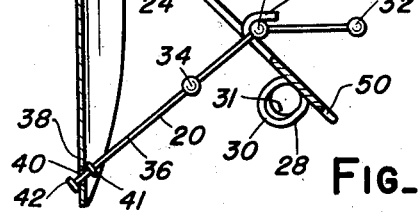

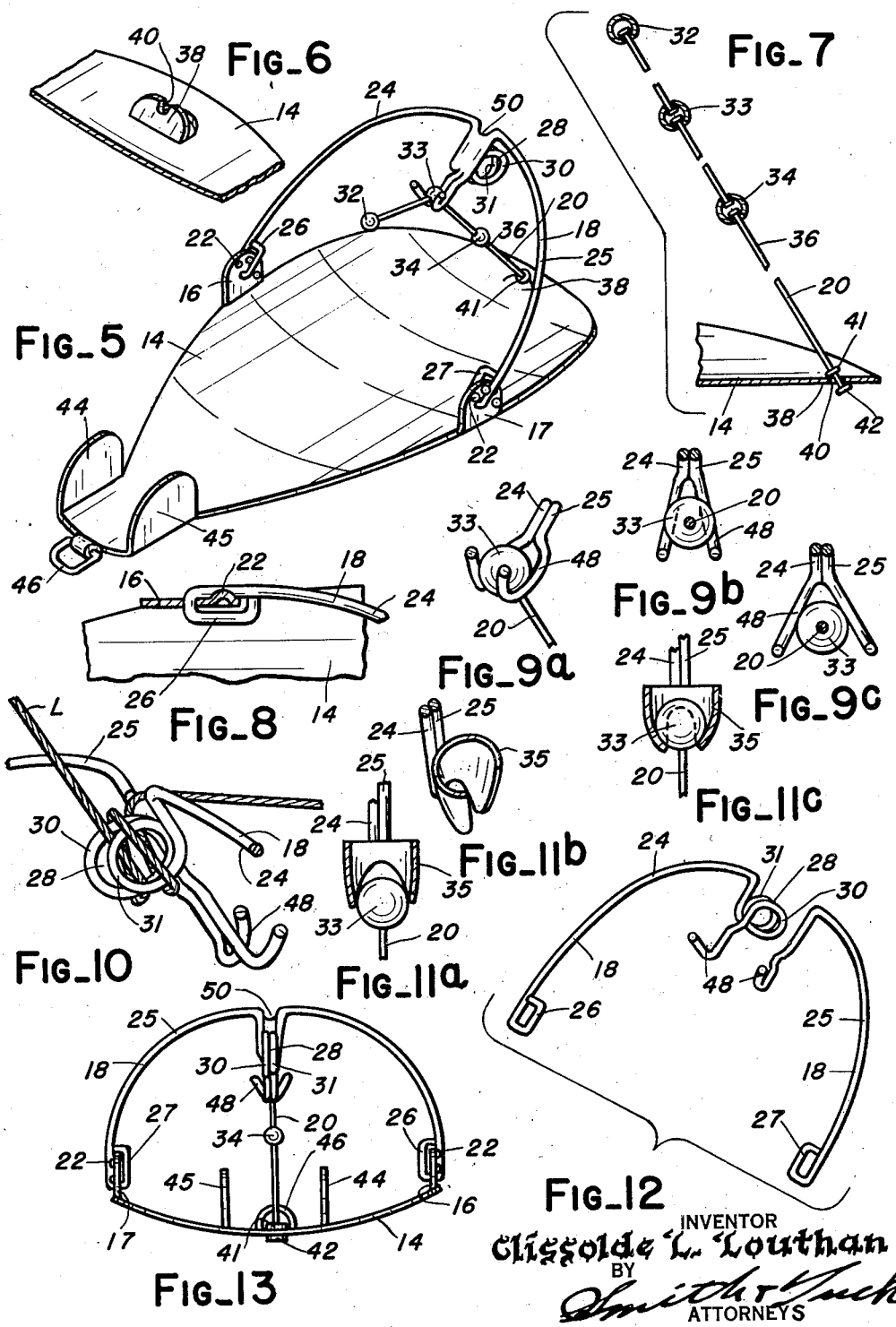

2,273,209

UNITED STATES PATENT OFFICE 2,273,209

FISHING KITE

Clissolde L. Louthan, Lakeside, Wash.

Application November 26, 1940, Serial No. 367,156

10 Claims. (Cl. 43—52)

My present invention relates to the art of fishing tackle and more particularly to a fishing kite which is used in place of the conventional lead weight to give deep submergence to fishing lures and baits.

My device consists of a body portion having an outer margin which when projected will produce substantially an egg-shaped contour and in which the surface is straight along its longitudinal axis and curved when viewed from either end. In this respect the body is similar to that shown in my co-pending application Serial No. 323,339, filed March 11, 1940, with the title Kite-like trolling sinker, and which application has eventuated in Patent No. 2,247,583, issued July 1, 1941. My present device, however, differs from my former structure by being provided with a bridle arrangement which has means to assure definite and exact setting of the bridle with respect to the longitudinal plane of the kite, and to thus definitely determine the angle to which the line will be carried with respect to the horizontal. Means are further provided to enable attaching the trolling line in a manner so that when a fish strikes, or the lure encounters an obstruction, as heavy weeds or the bottom, the line will be freed from the bridle and thus cause the kite to be no longer operative and be easily disentangled and raised to the surface where it may again be set.

A principal object of my present invention is to provide means for accurately determining the angle to which my fishing kite will carry a line down into the water as the device is being towed under trolling conditions.

A further object of my present invention is to provide line attaching and guiding means so arranged that the kite will be released when heavy strain comes on the line as by a fish striking or the kite itself being engaged so as to cause the heavy strain that might otherwise break the line.

A further object of my present invention is to provide releasing means which may be operated from the surface by the fisherman so that he can, at will, cause the kite to become inoperative and thus permit the easy disengagement of the same from fouling or to bring it to the surface easily for inspection of the lures, or for other reasons.

Other and more specific objects will be apparent from the following description taken in connection with the accompanying drawings, wherein Figure 1 is a side elevation of my trolling kite as it appears when attached to a trolling line and in use, Figure 2 is a longitudinal sectional view through the device of Figure 1, and illustrating the same in its position immediately after the trolling line has been released from its securing means; the alternate positions of the bridle are illustrated in dashed lines, Figure 3 is a top plan view of my device, Figure 4 is a longitudinal sectional view showing my device in the position it assumes immediately after being released from the trolling position after the showing of Figure 2, Figure 5 is a perspective view showing my device with the bridle in one of its set positions, Figure 6 is a fragmentary perspective view illustrating the first step in the forming of the body of my device for the insertion of the adjusting wires, Figure 7 is a fragmentary elevation showing the manner in which the adjusting wire is engaged, illustrating how the struck up portion illustrated in Figure 6 is bent back into its original alignment so as to secure the adjusting wire in position, Figure 8 is a fragmentary top plan view showing the manner, on enlarged scale, of securing the bridle to the lug which is struck from the body of my device, Figures 9a, 9b and 9c illustrate on an enlarged scale the manner in which the wire socket arrangement which is part of the bridle engages the ball as secured to the adjusting wire, Figure 10 is an enlarged perspective view showing the manner in which the towing line is secured to the friction clamp means which in turn is part of the bridle assembly, Figures 11a, 11b and 11c illustrate a modified form of socket and illustrate the manner in which it engages and releases the ball members secured to the bridle adjusting wire, Figure 12 is a bracketed view illustrating the two members which make up my bridle before these members are brazed, soldered or otherwise secured together, and Figure 13 is an end view of my device showing the bridle in its upper adjusted position.

Referring to the drawings, throughout which like reference characters indicate like parts, 14 designates the body of my device. This I prefer to form with an outer margin such that the projection of the body will be substantially egg-shaped with the wider end of the body disposed as the forward end of the kite as it is towed through the water. This body may be made of any suitable material, such as sheet metal, preferably of a non-corrosive type, or it may be made of plastic material, or possibly other materials that have not as yet been used by me.

Disposed somewhat forward of the longitudinal center of the body are upstanding ear or lug portions 16 and 17. These lugs have axially aligned openings therethrough to accommodate the two ends of the bail member 18. In order to assist in holding my bail under tension when it is in its set position against the tension of the flexible adjusting member 20 I have provided deformation in each of these upstanding lugs so that the wire of which bail 18 is made will come to rest against the deformation such as grooves, ridges, or pressed out bosses so that the bail itself will be under a degree of spring tension so that it will then be held in position with enough resistance so that it may be set and then thrown into the water without fear of this adjustment changing. In the drawings I have indicated these deformations as pressed out bosses indicated at 22.

The construction of my bail member is probably best illustrated by a study of Figures 5, 12 and 13. It will be noted that the bail is preferably formed of two members as 24 and 25, which at one extreme end are both bent back on themselves to form the closed eyes as at 26 and 27. This construction, which is probably best illustrated in Figures 12 and 13, serves to hold the bail member in firm contact with the lug or boss members 22. At the center of the bridle, where the two members 24 and 25 are joined together as by brazing or soldering or welding, I form on one of the legs of 24 the frictional engaging means 28. This is formed by coiling the wire so as to form two adjacent coils. These coils are made preferably after the showing of Figure 10 in which one of the coils as 30 extends outwardly farther than the adjacent coil 31. This provides a very convenient means of engaging the line between the two loops. It has been found that reasonably heavy spring wire must be employed for this purpose and the loops must be positioned in tight engagement if they are going to form a secure frictional engagement of the line. Under such conditions, particularly when the line L used is of fair size, it is difficult to engage the line between the loops, but where one of the loops as 30 extends outwardly from its adjacent loop it serves as a lever and the line is easily guided into the position illustrated in Figure 10. The two inner ends of wires 24 and 25 may be formed as illustrated in Figures 9a, 9b and 9c, so as to form a rest into which the positioned balls, as 32, 33 and 34 may be placed to secure definite adjusted position of the bridle with respect to the body of my kite. Under certain conditions it has been found desirable to form the ball-receiving socket from sheet metal after the modified form of structure shown in Figures 11a, 11b and 11c, in which case the sheet metal socket 35 is secured to the ends of wires 24 and 25 by some secure and convenient means.

At the leading end of body 14 I secure the spacing or adjusting member 36. This I prefer to form of a resilient wire which may be headed at each end, as illustrated in Figure 7, so that the ball connectors as 32, 33 and 34 may serve as swivels. This gives a sufficient degree of flexibility in member 36 to prevent tangling and assures free working of the device. I prefer to secure member 36 to the body of my device by the means probably best illustrated in Figure 6, wherein a lug as 38 is struck upwardly from the surface of body 14 with a pre-formed notch at 40. Member 36 has the two spaced heads 41 and 42 and they are placed so that the wire portion between the heads will rest in notch 40 and then lug 38 is pressed downwardly so that it lies in a plane of body 14. In this manner a secure engagement is made which will permit the removal or replacement of the tension member 36 and in so doing the minimum interruption is made to the smooth flow of water over the kite surface.

At the trailing end of my kite I provide preferably two vertically disposed rudders as 44 and 45. The plane of these rudders should be parallel to the axis of the kite so as to secure guiding control of the kite to the end that it will pass through the water in a straight line and not wobble from side to side, which action might readily interfere with proper operation of the lure and tend to promote tangling among other lines which may be in the water adjacent thereto.

At the extreme end of body 14 is provided the D-ring 46 which may be secured to the body in some convenient manner as by having an extension of the body bent around the tangent portion of the D or by having a separate draft which in turn is secured to body 14.

*Method of operation*

One practical method of employing my fishing kite is to use it intermediate on the line between the boat and the lure. Usually it is employed a distance of six to twenty feet from the lure. When the fisherman has by previous experience or from information, determined the approximate depth at which he wishes to fish, he sets the bridle member 18 in one of its adjusted positions. Throughout my various views I have shown the same as being set in an intermediate position. When so arranged the legs as 24 and 25 of bridle 18 abut corresponding bosses 22 on lugs 16 and 17 and then the bridle is sprung forwardly but not sufficient to cause it to jump over boss 22, so that when ball 33 is engaged in saddle 48 or the modified form of saddle indicated by reference character 35 a degree of tension will be secured which will tend to keep the bridle in its adjusted position. This is a very desirable condition in that the lure after being adjusted must be thrown overboard into the water and it wants to submerge in proper adjustment. Line L which leads up to the boat and back to the lure normally passes through D-ring 46. It is then led up over a notch at 50 which is formed between the juncture of member 24 and 25 and then it is led downwardly and wrapped once around the frictional engaging member 28. It is then passed between the two adjacent coils 30 and 31, after the showing of Figure 10, and in that position is locked in frictional engagement.

The lure and kite may now be thrown overboard with the full assurance that the kite will submerge the lure until the longitudinal plane of body 14 comes to a substantially horizontal position.

The fisherman may now pay out as much line as is necessary to achieve the depth desired. This is in contradistinction to fishing with a lead weight, in which the speed of the boat is the determining factor for a given weight as to the depth to which the line will be carried. With my device, however, a line of a given size will be carried downward to the same depth whether the boat is traveling fast or slow, due to the fact that the kite descends until its body is substantially horizontal. This is a different action from that which occurs in a kite being flown in air, because in that instance there is ever present the pull of gravity upon both the kite and the kite string. The fisherman is thus provided with a sinker which permits him to accurately determine the depth to which his lure is submerged, even though the speed of his boat may vary from time to time.

When a fish strikes, the pull on the line is sufficient to slip the line out from between jaws 30 and 31, thus producing the condition shown in Figure 2. From this position the kite immediately falls to the position shown in Figure 4 and is no longer operative and does not resist the pulling in of the line. At the same time it does not interfere with the playing of a hooked fish. This same result can be achieved at any time by the fisherman. He may merely slacken his line momentarily and give a quick jerk on the same. Then the resistance of the lure and the kite will be sufficient to cause the line to be disengaged and again permitting the action just recounted. In this manner the fisherman can easily retrieve his sinker arrangement, he can quickly free it so that it will unload itself of any accumulation of weeds and the like, or when so tripped it will normally be disentangled from any obstruction it may have engaged on the bottom of the fishing waters.

It is believed that experienced fishermen will employ my device in many manners different from that disclosed. Therefore, as the foregoing description and the accompanying drawings are believed to clearly disclose a preferred embodiment of my invention, it will be understood that this disclosure is merely illustrative and that such changes in the invention may be made as are fairly within the scope and spirit of the following claims.

I claim:

1. A fishing kite comprising an ovate transversely curved body plate having aligned side ears, a bail having loops journaled in said ears and supporting a fork, said bail also being provided with grip means to engage a trolling line, link means engaged between said fork and anchored to said body plate forward of the pivotal axis of said bail, trailing upright fin means on said body plate, and means on a rear portion of said body plate to guide a trolling line extending rearwardly from said line grip means.

2. A fishing kite comprising an ovate transversely curved body plate having aligned side ears, stop bosses on said ears, a bail journaled in said ears and having a fork, said bail also being provided with grip means to engage a trolling line, link means engaged between said fork and said body plate, and means on a rear portion of said body plate to engage a trolling line extending rearwardly from said line grip means.

3. A fishing kite comprising an ovate transversely curved body plate having aligned side bearing members, a bail journaled in said bearing members and having a fork, said bail also being provided with a grip means to engage a trolling line, a length of swivel chain having one end engaged in said fork and the other end anchored to said body plate forward of the pivotal axis of said bail, and means on a rear portion of said body plate to engage a trolling line extending rearwardly from said line grip means.

4. A fishing kite comprising an ovate transversely curved body plate, a bail journaled on said plate and having a fork, said bail also being provided with grip means for engaging a trolling line, a linkage between said fork and said body plate, trailing upright fin means on said body plate, and means on a rear portion of said body plate to engage a trolling line extending from said line grip means.

5. A fishing kite comprising a transversely curved body plate, a bail journaled on said plate having means to engage a trolling line, link means between said body plate and said bail, means on said bail to detachably receive said link means, fin means on said body plate, and means on a rear portion of said plate to engage a trolling line extending from said line engaging means.

6. A fishing kite comprising a body plate having bail bearing members, a bail journaled in said bearing members and having line grip means, link means between said bail and said body plate forward of the pivotal axis of said bail, and a loop on said body plate to engage a trolling line extending from said line grip.

7. A fishing kite comprising a body plate having side bearing members, a bail journaled in said bearing members and having line grip means, link means between said bail and said body plate, and means on a rear portion of said body plate to engage a trolling line extending from said line grip means.

8. A fishing kite comprising a curved body plate having angularly disposed edge ears, a bail journaled in said edge ears and having line grip means between said bail and said body plate forward of the pivotal axis of said bail, and means on a rear portion of said body plate to engage a trolling line extending from said line grip.

9. A fishing kite comprising an ovate transversely curved body plate, a bail journaled on said plate and having a fork, said bail also being provided with grip means for engaging a trolling line, link means between said fork and said body plate, vertical fin means on said body plate, and means on a rear portion of said body plate to engage a trolling line extending from said line grip means.

10. A fishing kite comprising an ovate transversely curved body plate having aligned side bearing member, a bail journaled in said bearing members and having a metal socket, said bail also being provided with grip means to engage a trolling line, link means engaged in said metal socket and anchored to said body plate forward of the pivotal axis of said bail, trailing upright fin means on said body plate, and means on a rear portion of said body plate to guide a trolling line extending rearwardly from said line grip means.

CLISSOLDE L. LOUTHAN.